United States Patent [19]
Takada et al.

[11] Patent Number: 5,243,264
[45] Date of Patent: Sep. 7, 1993

[54] TOOL FASTENING APPARATUS FOR INDUSTRIAL ROBOTS

[75] Inventors: Susumu Takada; Masayuki Hosono; Junji Sakashita; Hiroshi Miyachi; Yoshiteru Ueno; Masahito Tanigawa, all of Soka, Japan

[73] Assignee: SMC Corporation, Tokyo, Japan

[21] Appl. No.: 850,420

[22] Filed: Mar. 12, 1992

[30] Foreign Application Priority Data

Mar. 12, 1991 [JP] Japan ................ 3-21911[U]

[51] Int. Cl.$^5$ ............................................. B25J 15/24
[52] U.S. Cl. .................... 318/568.11; 318/568.10; 318/567; 901/30; 901/34; 403/328; 403/90; 403/127
[58] Field of Search ............................ 318/560–573; 395/80–99; 29/26 A, 39, 42, 739; 414/730; 901/28, 30, 37, 41, 3, 7, 9, 15–23; 403/328, 90, 127

[56] References Cited

U.S. PATENT DOCUMENTS

| | | | |
|---|---|---|---|
| 4,549,846 | 10/1985 | Torii et al. .................. | 901/30 |
| 4,623,229 | 11/1986 | Galan . | |
| 4,636,135 | 1/1987 | Banicon ..................... | 901/28 |
| 4,652,203 | 3/1987 | Nakashima et al. ........ | 901/30 X |
| 4,682,932 | 7/1987 | Yoshino ..................... | 901/28 |
| 4,694,230 | 9/1987 | Slocum et al. .............. | 318/568 |
| 4,767,257 | 8/1988 | Kato .......................... | 901/28 |
| 4,790,053 | 12/1988 | Godbecker .................. | 901/30 |
| 4,793,053 | 12/1988 | Zuccaro et al. ............ | 901/30 X |
| 4,863,206 | 9/1989 | Kaufmann .................. | 901/28 X |
| 4,897,014 | 1/1990 | Tietze ......................... | 901/28 |
| 4,906,123 | 3/1990 | Weskamp et al. .......... | 901/28 X |
| 4,913,617 | 4/1990 | Nicholson .................. | 901/30 X |
| 4,944,629 | 7/1990 | Peveto ........................ | 901/30 X |
| 4,990,022 | 2/1991 | Watanabe et al. .......... | 901/28 |
| 4,990,839 | 2/1991 | Schonlau .................... | 318/568.1 |
| 5,069,524 | 12/1991 | Watanabe et al. .......... | 901/28 |

Primary Examiner—Paul Ip
Attorney, Agent, or Firm—Oblon, Spivak, McClelland, Maier & Neustadt

[57] ABSTRACT

A tool fastening apparatus for industrial robots comprises a coupling unit attached to the arm of a robot and a coupling unit attached to a tool to be used with the robot. When the two coupling units are joined together, their relative position can be easily and accurately fixed by means of positioning couplings comprising ball rings carrying a set of annularly arranged balls slightly sticking out from the plane of contact between the two coupling units. Accurate positioning is achieved by bringing the balls on the two ball rings into engagement, which, in turn, is achieved by fitting each ball on one ball ring into between two adjoining balls on the other ball ring.

11 Claims, 8 Drawing Sheets

TOOL FASTENING APPARATUS FOR INDUSTRIAL ROBOTS

FIELD OF THE INVENTION

This invention relates to tool fastening apparatus for fastening a manipulating hand and other tools to the tip of the arm of an industrial robot.

DESCRIPTION OF THE PRIOR ART

Robots having a hand and other tools fastened to the tip of their arm are used to perform assembling and other kinds of work. These robots are designed to use various types of interchangeable tools suited for the profile of each workpiece they handle and the type of each work they perform.

Also, these robots have a capability to automatically change the tools they operate, which increases the utilization rate of the robots. This automatic tool change has been achieved by means of a fastening apparatus comprising a connecting unit attached to the arm of the robot and a connecting unit attached to each tool. A tool is fastened to the arm of the robot by joining together the connecting units thereon. The interchangeable tools to be used are held on standby in a predetermined state on a tool stand provided in a given position. The robot carries a used tool to the position assigned thereto on the tool stand to release the tool from the tip of the arm thereof by separating the joined connecting units. Then, the robot carrying no tool moves to where the tool to be used in the next operation is held on the tool stand to pick it up. After the new tool has been fastened to the arm by means of the connecting units, the robot proceeds to the next operation.

But the new tool cannot perform its function satisfactorily if the arm-side and tool-side coupling units are not aligned to each other and the arm and tool are not accurately positioned around the axes thereof.

To assure exact positioning and connecting, a tapered pit is provided on one of a pair of conventional coupling units and a tapered projection on the other. While the alignment of the axes of the two coupling units is achieved by engaging the tapered pit and projection, the positioning around the aligned axes is achieved by engaging a pin on one unit with a pin hole in the other.

However, though relatively effective for alignment, the tapered pit and projection do not assure accurate axial connection, as a result of which the overall length of the arm of the robot and tool varies every time the tool is changed. Furthermore, a clearance (usually between approximately 0.02 mm and 0.03 mm) provided in the pin hole to facilitate the insertion of the pin makes it practically impossible to prevent the rattling of the connected arm and tool in the rotating direction. A reduction in this clearance necessitates a closer machining tolerance, entailing an increase in cost.

As the tool fastened to the tip of the arm of the robot must obtain a supply of hydraulic fluid for operation through the connecting unit on the arm, a fluid passage coupling is provided in each of the contact surfaces of the arm-side and tool-side coupling units to provide a communicating passage when they are joined together.

However, there is a need to provide means to properly position the two coupling units in the contact surfaces thereof. Because of this need, the fluid passage coupling must be provided on the peripheral edge of each unit, which, as a consequence, increases the diameter of each unit and the size of the whole assembly. As this size increase, in turn, gives rise to a need to increase the strength and operating power of the arm of the robot, it is necessary to minimize the size increase associated with the provision of the fluid passage coupling. The provision of electrical couplings on the two coupling units also involves a similar problem.

SUMMARY OF THE INVENTION

A primary object of this invention is to provide an inexpensive detachable tool fastening apparatus that easily and accurately fix the relative position of the coupling units on the arm of the robot and the tool to be connected thereto.

Another object of this invention is to provide an inexpensive tool fastening apparatus that achieves accurate positioning by means of inexpensive steel balls made to close dimensional tolerances for use as elements of ball bearings and other mechanical devices that are available in large quantities.

Still another object of this invention is to provide a small tool fastening apparatus for industrial robots with a capability of precision positioning.

Yet another object of this invention is to provide a small tool fastening apparatus which comprises coupling units attached to the arm of the robot and the tool, each of which having a ball ring comprising a set of annularly arranged balls, with the two ball rings coming into engagement with each other assuring accurate alignment and axial positioning.

A further object of this invention is to provide a tool fastening apparatus having a hydraulic fluid passage coupling on the contact surface of each of the coupling units attached to the arm of the robot and the tool that is small enough to minimize an increase in the area of the contact surfaces, thereby preventing an increase in the size of the two coupling units.

To achieve the above objects, a tool fastening apparatus according to this invention essentially comprises a coupling unit attached to the arm of the robot and another one attached to the tool, each of which having on the contact surface thereof a positioning ball ring comprising a set of annularly arranged balls slightly sticking out from the contact surface, with the two coupling units properly positioned by fitting each ball in one ball ring into between two adjoining balls in the other ball ring.

Each of the ball rings on the arm-side and tool-side coupling units comprises an annular ball base, a set of balls closely packed in an annular groove provided in the center of one surface of the ball base with a part of the balls sticking out therefrom, and an annular ball holder having a tapered outer surface to hold the balls in position and fitted on the inside of the balls to fix the balls between the ball base and ball holder. Each of the ball bases on the arm side and tool side has an engaging hole opening to the ball-carrying groove, with an engaging ball inserted therein. This engaging ball, which slightly sticks out into between a pair of adjoining balls, fixes the position of the arranged balls. The arranged balls are easily and accurately fixed by displacing the set of balls in the ball ring on the arm of the robot from that on the tool by a distance equal to one half of the diameter of the balls.

One of the ball bases may have a plurality of guide pins to keep the relative displacement between the two coupling units within the limit to assure the proper engagement thereof, while the other ball base may have a corresponding number of pin holes to accommodate the guide pins. Also, each of the two coupling units may have a fluid passage coupling to allow the supply of the compressed air or other tool-actuating hydraulic fluid when the two units are joined together. Provision of the guide pins, pin holes and fluid passage couplings inside the set of balls on the ball rings is conducive to the size reduction of the whole apparatus.

As electrical connectors, a set of contact terminals may be provided on a detachable arched base that is bolted to a part of the periphery of the contacting edges of the two coupling units, thereby minimizing the projection of the connectors.

Also, the tool fastening apparatus of this invention may have a piston that reciprocates in a cylinder bore provided in the coupling unit attached to the arm of the robot. The support section of the piston carries a pair of hooks to engage with and disengage from the coupling unit attached to the tool that is pivotally attached thereto in the middle portion thereof, with an engaging grip to engage with a part of the tool-side coupling unit provided at the tip of each hook. The arm-side coupling unit has a release pin positioned between the paired hooks to release the engaging grip on the hook when the piston moves. The engaging grip at the tip of the hook engages with an engaging member on the tool-side coupling unit when the piston exerts a compressive force on the two coupling units, thereby assuring a stable linkage.

When the arm- and tool-side coupling units are put together, the ball rings thereon engage with each other to automatically and easily achieve accurate alignment and positioning around the axes thereof. The compact fluid passage couplings that connect with each other when the arm- and tool-side coupling units are put together permits the downsizing of the entire assembly.

DESCRIPTION OF THE PREFERRED EMBODIMENTS

Figure 1:
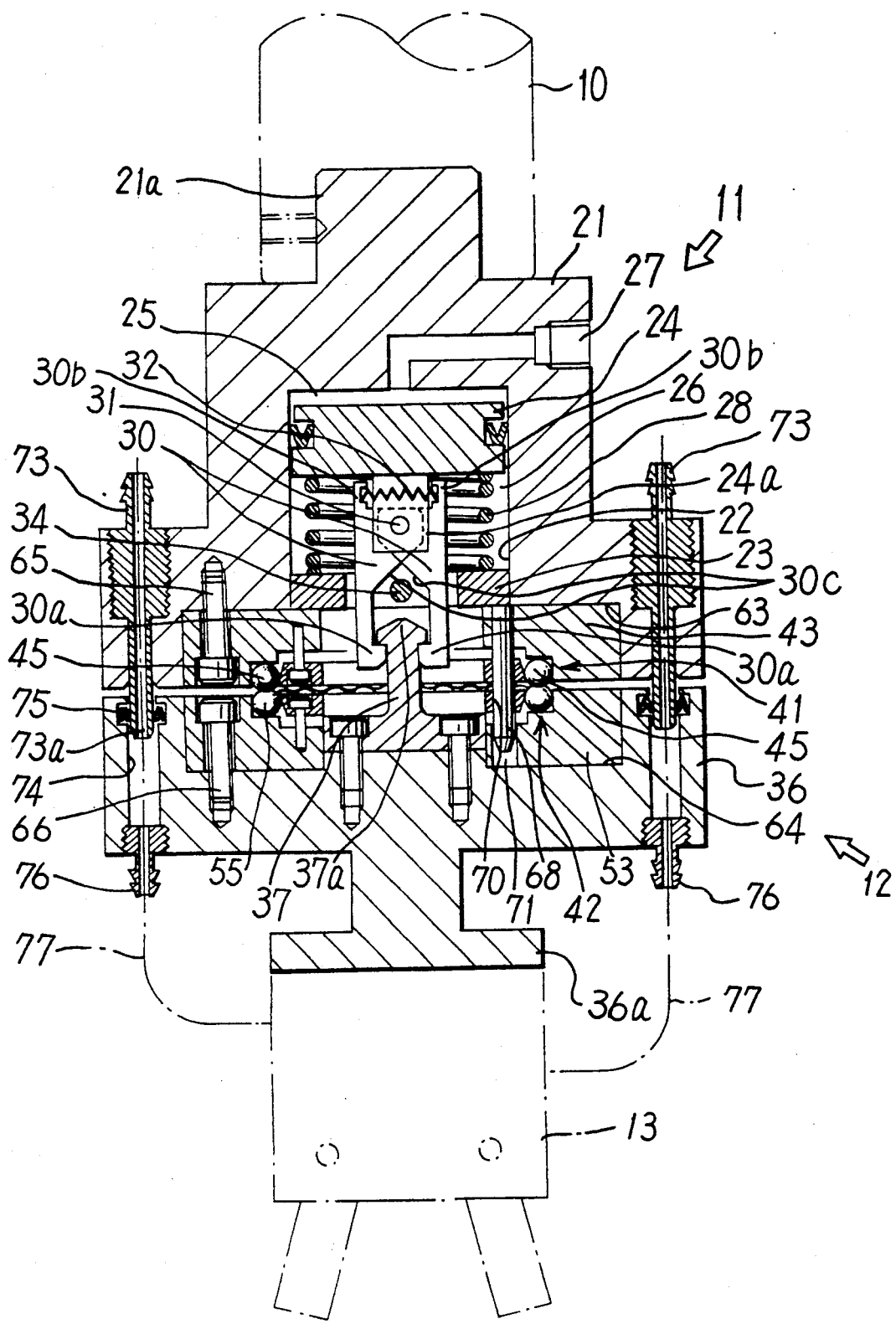
FIG. 1 is a cross-sectional front view showing a preferred embodiment of this invention.

FIG. 1 shows the general construction of a preferred embodiment of a tool fastening apparatus according to this invention, which comprises a coupling unit 11 attached to the tip 10 of the arm of the robot and another coupling unit 12 attached to a pneumatically operated hand, which is one of the tools attached to the arm of the robot. The two coupling units 11 and 12 are detachably connected to each other.

The casing 21 of the arm-side coupling unit has a projection 21a that engages with the tip of the arm of the robot and a cylinder bore 22 on the inside that opens in that surface of the unit which faces the coupling unit 12 on the tool, with an annular spring support 23 fitted at the mouth of the cylinder bore 22. The piston 24 divides the inside of the cylinder bore 22 into a pressure chamber 25 on the inner side and a breathing chamber 26 closer to the spring support 23. The pressure chamber 25 communicates with a port 27, through which the compressed air is supplied and discharged, that opens to outside the casing 21. A compressed reset spring 28 is interposed between the piston 24 and the spring support 23.

The middle part of a pair of hooks 30 to bring into and out of engagement with the coupling unit 12 is pivotally connected to a support projection 24a, which sticks out from the piston 24 to the direction of the spring support 23, by means of a support pin 31. Each hook 30 has an engaging grip 30a, which engages with a part of the coupling unit 12 on the tool and sticks out through an opening at the center of the spring support 23, at the tip thereof, with a compressed open-close spring 32 interposed between the base ends 30b thereof. The open-close spring 32 brings the engaging grips 30a closer to each other.

A release pin 34 disposed between the pair of hooks 30 to release the engaging grips 30a is provided in the opening at the center of the spring support 23. Also, each hook 30 has an inclined surface 30c at the opposite end of the release pin 34. The release pin 34 opens the engaging grips 30a when the piston 24 moves to bring the inclined surfaces 30c of the hooks into contact with the release pin 34.

The casing 36 of the coupling unit 12 on the tool has a tool fastener 36a that fixes a pneumatically operated hand 13 or other types of tool in position and an engaging member 37 sticking out at the center of the plane where the coupling unit 12 comes in contact with the coupling unit 11 on the arm to engage with the engaging grips 30a on the hooks 30. The engaging member 37 has an engaging head 37a that is designed to engage with the engaging grips 30a when the piston 24 moves downward a little. When the coupling units 11 and 12 come in contact with each other, therefore, the reset spring 28 pulls the engaging member 37 toward the coupling unit 11, thereby pressing the contact surface of the coupling unit 12 against that of the coupling unit 11.

When the compressed air is supplied into the pressure chamber 25 through the port 27 in the condition shown in FIG. 1, the piston 24 and hooks 30 move downward and the release pin 34 pushes open the inclined surfaces 30c, thereby opening the engaging grips 30a to bring out of engagement with a part of the coupling unit 12 on the tool and releasing the coupling unit 12 from the coupling unit 11 on the arm of the robot. When the compressed air in the pressure chamber 25 is discharged outside, the reset spring 28 causes the piston 24 and hooks 30 to move upward to the original position shown in FIG. 1.

To bring the coupling units 11 and 12 into contact, the engaging head 37a of the engaging member 37 is pressed into between the engaging grips 30a of the hooks 30 beforehand by pressing together the contact surfaces of the two units. On supplying the compressed air into the pressure chamber 25 through the port 27, the engaging grips 30a of the hooks 30 are opened. Or, the compressed air may be discharged from the pressure chamber 25 after bringing the contact surfaces of the coupling units 11 and 12 into contact with the engaging grips 30a of the hooks 30 kept open by the compressed air supplied into the pressure chamber 25. This causes the engaging grips 30a of the hooks 30 to engage with the engaging head 37a of the engaging member 37, whereupon the reset spring 28 pulls the engaging member 37 toward the coupling unit 11 on the arm of the robot and, as a consequence, the contact surface of the coupling unit 12 on the tool is pressed against the contact surface of the coupling unit 11 on the arm of the robot.

To place the joined coupling units 11 and 12 in proper position, ball rings 41 and 42, which serve as positioning couplings, are provided in the contact surfaces of the casings 21 and 36 of the two units. The ball rings 41 and 42 are composed substantially similarly. As will be detailed in the following, each of the ball rings 41 and 42 comprises a set of annularly packed balls. The coupling units 11 and 12 are aligned and properly positioned around the axes thereof by bringing the individual balls in to engagement with each other.

Figure 2:
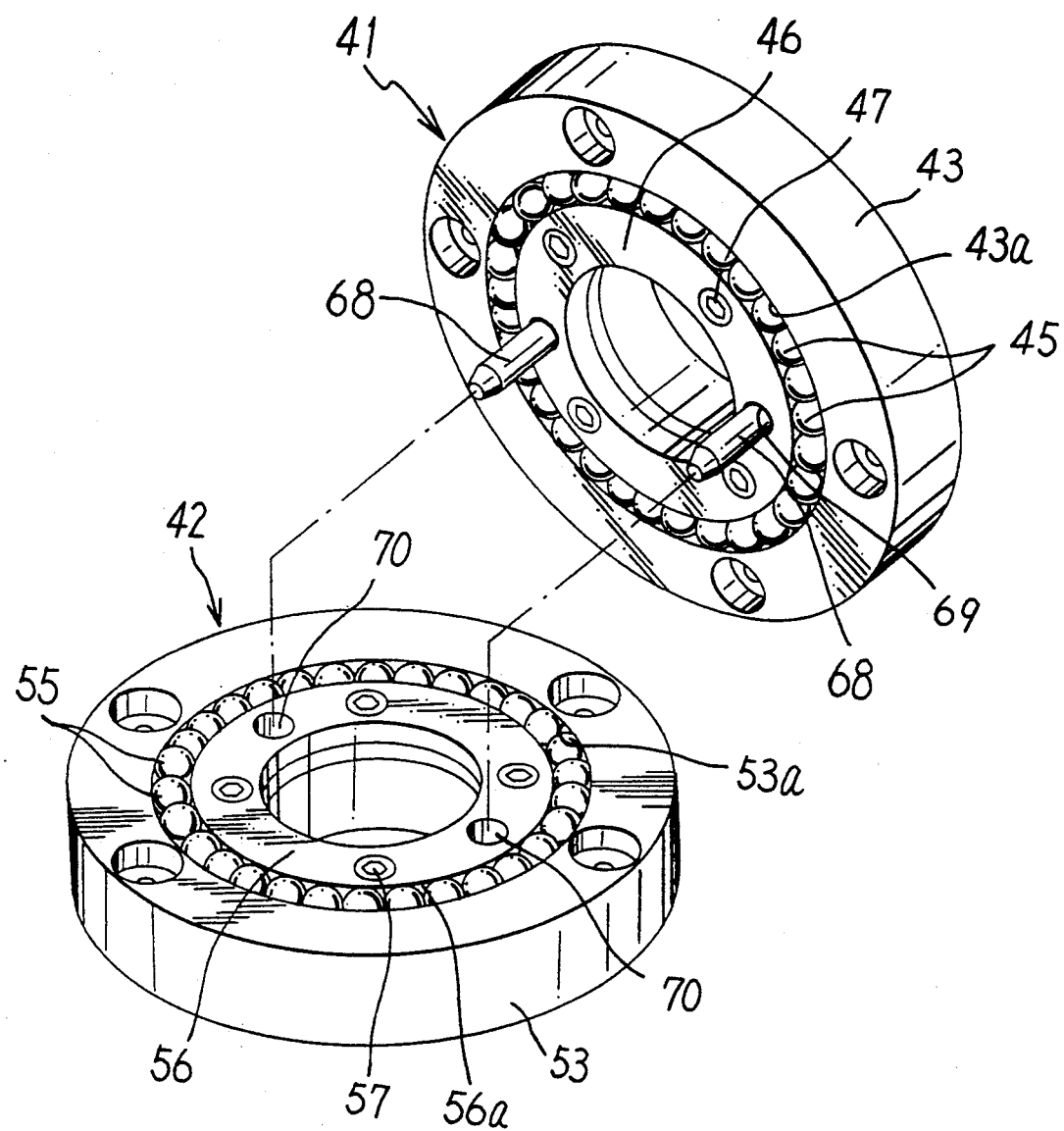
FIG. 2 is a perspective view showing the arrangement of a pair of ball rings.
Figure 3:
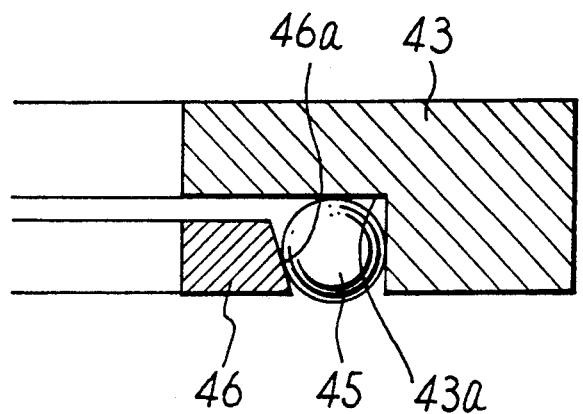
FIG. 3 is a cross-sectional view enlarging the principal part of the ball ring and a ball fitted therein.
Figure 4:
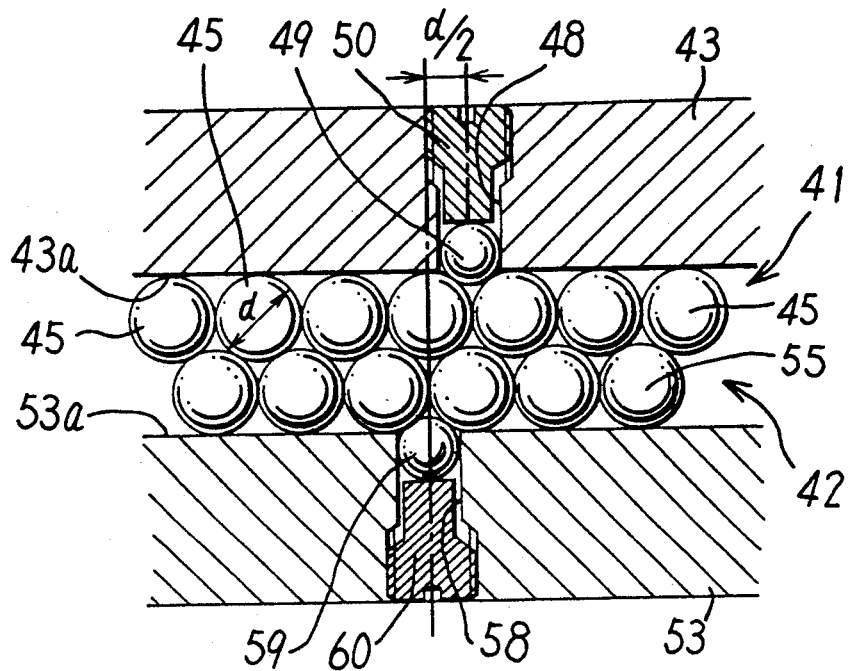
FIG. 4 is a cross-sectional view enlarging the set of balls arranged in the ball ring.

As shown in FIGS. 2 to 4, the ball ring 41 has an annular ball base 43, which, in turn, has an annular groove 43a in the center of one side thereof to accommodate a set of closely packed steel balls 45 that stick out slightly. The balls 45 are fixed between the ball base 43 and an annular ball holder 46 having a tapered outer surface 46a that holds the balls 45 in position when fitted within the annularly arranged set of the balls 45 and fastened with bolts 47. As shown in FIG. 4, the ball base 43 has an engaging hole 48 extending from the back side thereof to the front side where the set of balls 45 are disposed. A part of an engaging ball 49 fitted in the engaging hole 48 sticks out into between a pair of adjoining balls set in the groove 43a, whereby the balls 45 are closely packed together and firmly fixed in position.

Figure 5:
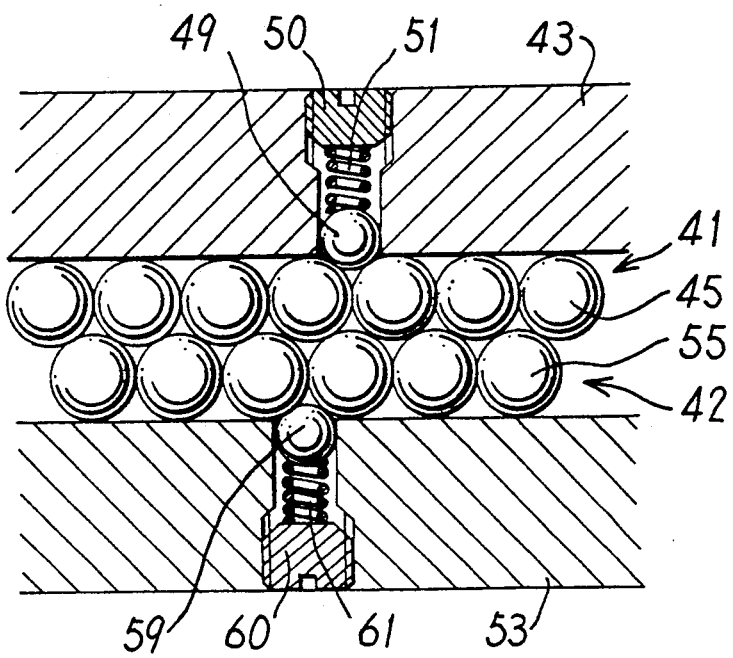
FIG. 5 is a cross-sectional view showing the same part of another preferred embodiment as FIG. 4.
Figure 6:
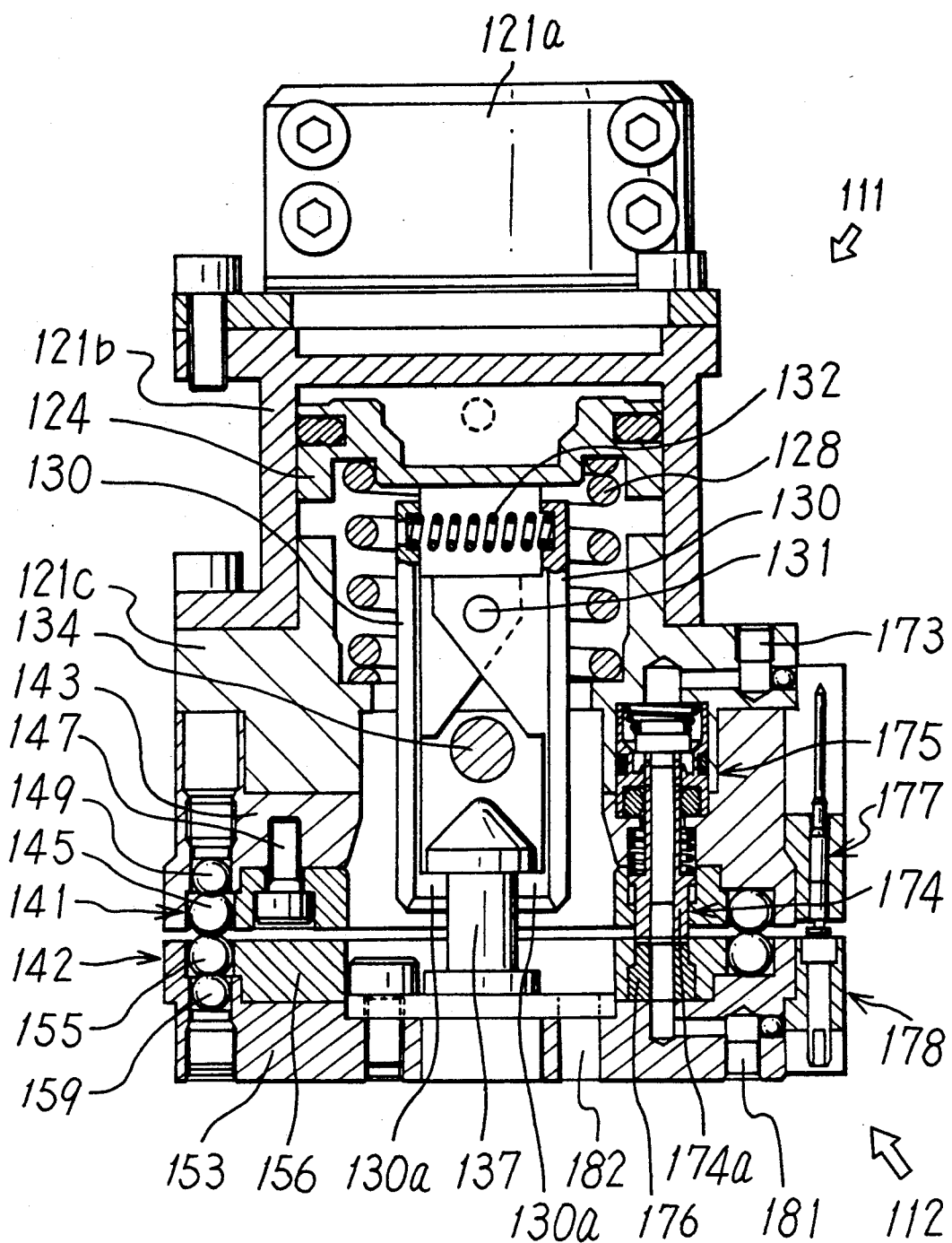
FIG. 6 is a cross-sectional view of a second preferred embodiment of this invention.
Figure 7:
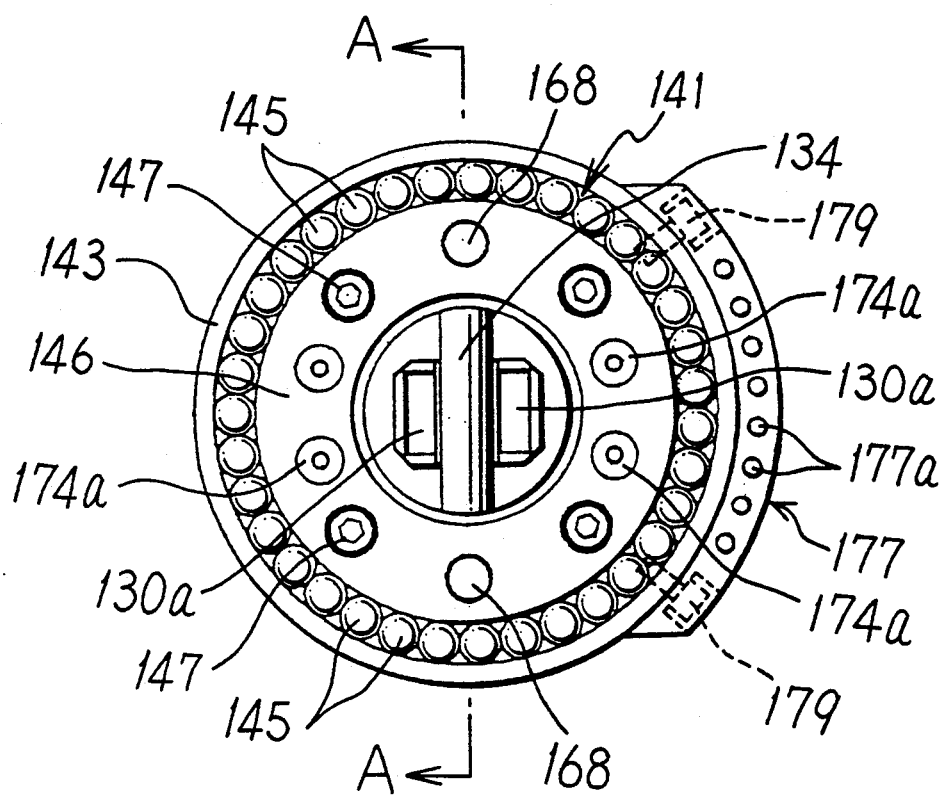
FIG. 7 is a bottom view of a coupling unit on the arm of the robot in the second preferred embodiment.
Figure 8:
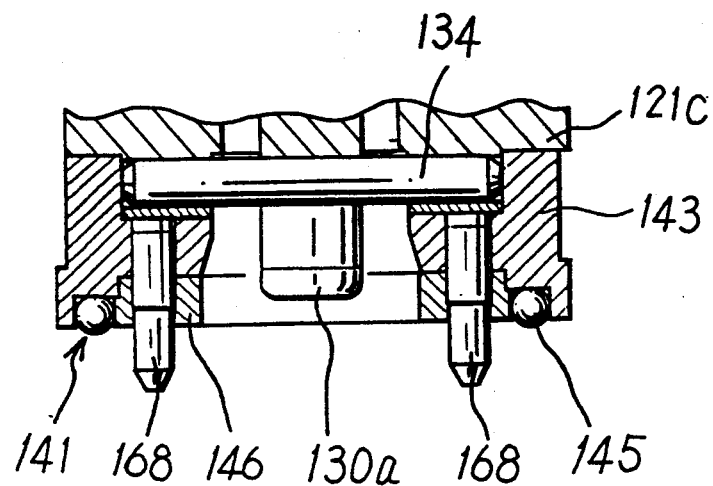
FIG. 8 is a cross-sectional view taken along the line A—A of FIG. 7.
Figure 9:
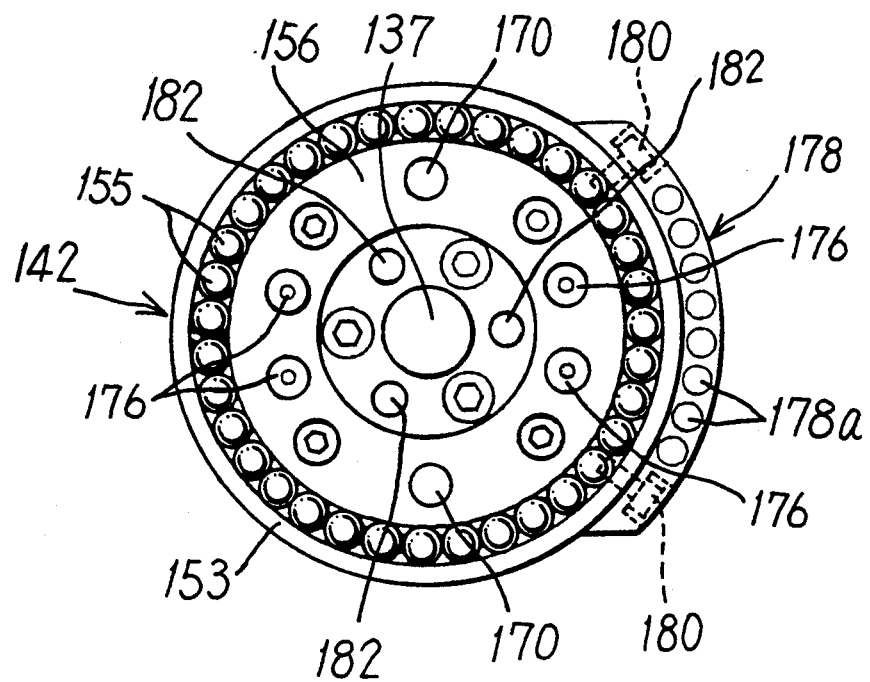
FIG. 9 is a plan of a coupling unit attached to the tool.

The engaging ball 49 may be supported either directly by a tap bolt 50 that is screwed in from behind as shown in FIG. 4 or indirectly through a keep spring 51 as shown in FIG. 5.

The ball ring 42 on the contact surface of the casing 36 is similarly constructed. A set of closely packed balls 55 are disposed in a groove 53a on one side of a ball base 53. The balls are fixed between the ball base 53 and a ball holder 56 having a tapered outer surface 56a and fastened with bolts 57. An engaging hole 58 in the ball base 53 accommodates an engaging ball 59 that partly sticks out into between a pair of adjoining balls 55. The engaging ball 59 is also supported either directly by a tap bolt 60 or indirectly through a keep spring 61.

The ball rings 41 and 42 are held in position by means of the ball bases 43 and 53 that are fitted in recesses 63 and 64 provided in the casings 21 and 36 and fastened with bolts 65 and 66. Here, it is essential to displace the balls 45 on the ball ring 41 from the balls 55 on the ball ring 42 by a distance equal to one half of the diameter of the balls. This displacement causes the balls 45 on the ball ring 41 to fit between and engage with the balls 55 on the ball ring 42, thereby firmly fixing the two coupling units 11 and 12 in position around the axes thereof, as shown in FIGS. 4 and 5. The overall engagement of the balls 45 and 55 thus achieved keeps the ball rings 41 and 42 and, therefore, the two coupling units 11 and 12 in exact alignment with each other.

The ball base 43 on one coupling unit 11 has a pair of guide pins 68 that stick out through holes 69 provided in the ball holder 46. The ball holder 56 and ball base 53 on the other coupling unit 12 have pin holes 70 and 71 to accommodate the guide pins 68. The guide pins 68 and pin holes 70 and 71 function to keep the relative displacement, which might arise between the approaching coupling unit 11 on the arm of the robot and the waiting coupling unit 12 on the tool to be connected thereto, within the limit to assure the proper engagement between the balls 45 and 55. To be more specific, the guide pins 68 themselves do not fix the two coupling units in position, but serve as probes. Therefore, the guide pins 68 and pin holes 70 and 71 need not be engaged with as high an accuracy as is needed for positioning. For example, a clearance of the order of 0.5 mm is tolerable.

Because of the engagement between the balls 45 and 55 on the ball rings 41 and 42, thus, the coupling units 11 and 12 are automatically aligned and positioned around the axes thereof by simply putting them together.

The casing 21 on the arm of the robot also has a tube connector 73 to which a compressed air supply tube is connected. The tip 73a of the tube connector 73 sticks out from the plane of contact with the coupling unit 12 on the tool. When the coupling unit 12 is connected, the projecting tip 73a fits in a connection hole 74 provided in the casing 36, with the junction therebetween sealed with a seal ring 75. The coupling unit 12 also has a tube connector 76 that communicates with the connection hole 74 and leads to the pneumatically operated hand 13 through a tube 77.

FIGS. 6 to 10 show another preferred embodiment of this invention, which is a tool fastening apparatus of a smaller size. The smaller tool fastening apparatus effectively expands the work area of the arm of the robot.

The tool fastening apparatus illustrated in FIGS. 6 to 10 has a coupling unit 111 attached to the tip of the arm of the robot and a coupling unit 112 attached to the tip of a tool. A connector 121a to be connected to the arm of the robot, a cylinder 121b and a base 121c, which make up the casing of the coupling unit on the arm of the robot, are integrally combined with a ball base 143 of a ball ring 141, which constitutes a positioning coupling, by means of fastening bolts.

A compressed reset spring 128 is interposed between a piston 124 reciprocatably fitted in the cylinder 121 of the coupling unit 111 on the arm of the robot and the base 121c thereof. A pair of hooks 130, which engage with an engaging member 137 on the coupling unit 112 on the tool like the hooks 30 mentioned before, are pivotally attached to the piston 124 with a support pin 131. The pair of hooks 130 are urged by a compressed open-close spring 132 provided at the base end in the direction to bring a pair of engaging grips 130a closer to each other. A release pin 134 to open the pair of hooks 130 is attached to the base 121c.

A ball ring 141 comprises a set of balls packed along the periphery of an annular ball base 143 and fixed in position by means of an annular ball holder 146 that is fastened on the inside thereof with bolts 147, as with the preferred embodiment described before.

Like the coupling unit 111 on the arm of the robot, the coupling unit 112 on the tool also comprises a set of balls packed along the periphery of an annular ball base 153 that doubles as the casing of the unit and fastened on a ball ring 142 by means of an annular ball holder 156, as shown in FIGS. 6 to 9. As with the preferred embodiment described before, the ball rings 141 and 142 on the coupling units 111 and 112 have engaging balls 149 and 159 that are pressed in between a pair of adjoining balls 145 or 155. The engaging member 137 to engage with the hooks 130 is provided at the center of the ball base 153.

The ball base 143 of the coupling unit 111 on the arm of the robot has a pair of guide pins 168 that stick out through a pair of holes provided in the ball holder 146 on the inside of the balls 145. The ball holder 156 and ball base 153 on the coupling unit 112 on the tool have corresponding pin holes 170 to accommodate the guide pins 168. As with the embodiment described before, the guide pins 168 and pin holes 170 function to keep the relative displacement, which might arise when the two coupling units 111 and 112 move closer, within the limit to assure the proper engagement between the balls 145 and 155.

Figure 10:
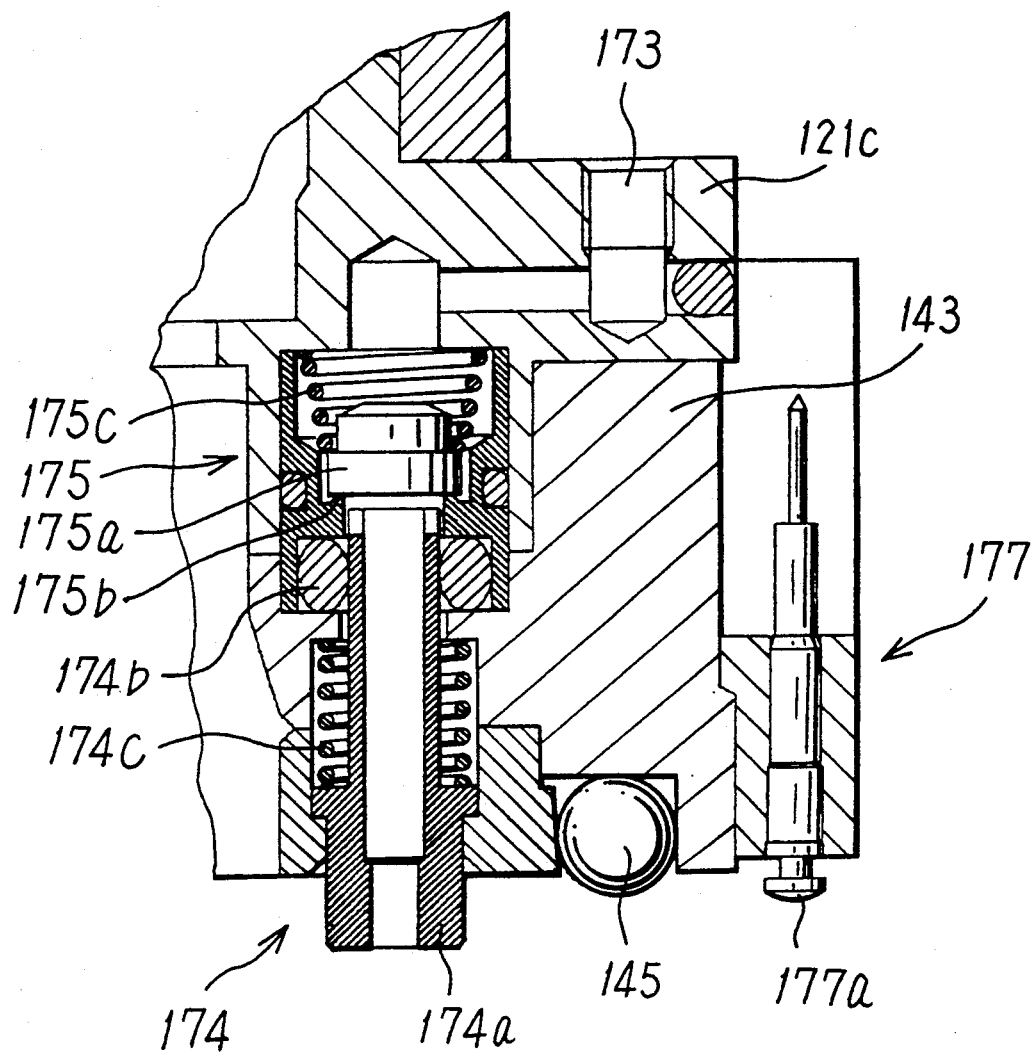
FIG. 10 is a cross-sectional view enlarging the principal part of a coupling unit attached to the arm of the robot.

The coupling unit 111 on the arm of the robot has a port 173 to connect a compressed air supply tube and a fluid passage coupling 174 provided with a valve mechanism 175 communicating with the port 173 and opens a passage when connected to the coupling unit 112 on the tool. The valve mechanism 175 and fluid passage coupling 174 are accommodated inside the balls 145 and through the casing, which comprises the base 121c and ball base 143, and the ball holder 146. As shown in FIG. 10, the fluid passage coupling 174 is sealed with a sealing member 174b and has a projecting tube 174a that is urged by a spring 174c to stick out from the plane of contact with the coupling unit 112 on the tool. The tip of the projecting tube 174a, which serves as a passage for the fluid supplied from the port 173, comes in contact with a sealing member 176 on the coupling unit 112 on the tool when the two coupling units are joined together, thereby bringing the inner passage into communication with the passage at the center of the sealing member 176. The coupling unit 112 on the tool has an output port 181 to communicate with the passage at the center of the sealing member 176 in the surface that comes in contact with the tool attached thereto to permit the connection of the passage with one in the tool.

The valve mechanism 175 provided in the fluid passage coupling 174 has a valve body 175a that is positioned opposite to the inner end of the projecting tube 174a and urged by a spring 175c so as to come in, and out of, contact with a valve seat 175b provided around the inner end of the projecting tube. When the projecting tube 174a is pressed against the sealing member 176 when the coupling units 111 and 112 are joined together, the valve body 175a comes out of contact with the valve seat 175b under the influence of the pressure exerted by the inner end of the projecting tube, thereby allowing the fluid from the port 173 to flow into the space between the valve body 175a and valve seat 175b and into the projecting tube 174a through a notch at the inner end of the projecting tube 174a. As such, when the coupling units 111 and 112 are not joined together, the valve body 175a urged by the spring 174c closes the valve seat 175b to automatically stop the discharge of the fluid therethrough.

Provision of the guide pins 168, the pin holes 170 and the fluid passage coupling 174 having the valve mechanism 175 inside the set of balls on the ball rings 141 and 142 increases the diameter of the rings of balls arranged thereon. The larger rings of balls assure more accurate positioning and permit an effective use of the inner space and a size reduction of the two joining units as a whole.

As electrical connectors, a set of contact terminals may be provided on a detachable arched base that is bolted to a part of the periphery of the contacting edges of the two coupling units, thereby minimizing the projection of the connectors.

To the periphery of the contacting edges of the coupling units 111 and 112 are attached, with bolts 179 and 180, arched electric connectors 177 and 178 carrying a set of terminals 177a and 178a that are disposed along the curved periphery of the units 111 and 112. The terminals on the connectors 177 and 178, which slightly stick out by means of springs contained therein, are pressed into contact with each other when the two coupling units are joined together, thereby establishing an electrical connection therebetween. Reference numeral 182 in the figure designates a tool fitting hole.

What is claimed is:

1. A tool fastening apparatus for industrial robots that fastens an interchangeable tool to an arm of a robot comprising:

a first detachable coupling unit attached to the arm of the robot and a second detachable coupling unit attached to the tool; and ball rings constituting positioning couplings which are composed of a set of annularly disposed balls sticking out slightly from the plane of contact between said first and second coupling units;

the two coupling units being properly positioned related to each other by bringing the balls on one ball ring into engagement with the balls on the other ball ring by fitting each ball on one ball ring into between two adjoining balls on the other ball ring so as to maintain an alignment of the first coupling unit with the second coupling unit.

2. A tool fastening apparatus for industrial robots according to claim 1, in which:

each of the coupling units attached to the arm of the robot and the tool comprises an annular ball base that has an annular groove at a center of one surface thereof to hold a set of balls closely packed together and sticking out slightly from the ball base, and an annular ball holder having a tapered outer surface to hold the balls in position that is fitted inside the ring of the balls to non-rotatably fix the balls in position between the ball base and ball holder.

3. A tool fastening apparatus for industrial robots according to claim 2, in which:

each of the ball bases on the coupling units attached to the arm of the robot and the tool has an engaging hole opening toward the set of balls and accommodating an engaging ball which slightly sticks out into between a pair of adjoining balls on the ball ring to fix the balls in position; and the balls on the ball ring of the coupling units attached to the arm of the robot are displaced from the balls on the ball ring of the coupling units attached to the tool by a distance equal to one half of the diameter of the ball.

4. A tool fastening apparatus for industrial robots according to claim 1, in which:

the ball base on one coupling unit has a plurality of guide pins to keep the relative displacement between the two coupling units within the limit to assure the proper engagement between the balls thereon and the ball base on the other coupling unit has a corresponding number of pin holes to accommodate the guide pins.

5. A tool fastening apparatus for industrial robots according to claim 1, in which:

a pair of hooks to bring into and out of engagement with the coupling unit attached to the tool is pivotally connected, in the middle part thereof, to a support on a piston reciprocating in a cylinder provided in the coupling unit attached to the arm of the robot, with an engaging grip to engage with a part of the coupling unit on the tool being provided at the tip of each hooks; and a release pin disposed between the pair of hooks to release the engaging grips when the piston moves is provided on the coupling unit attached to the arm of the robot.

6. A tool fastening apparatus for industrial robots according to claim 1, in which:

the engaging grips at the tip of the hooks are adapted to engage with an engaging member on the coupling unit attached to the tool when the piston exerts a pressing force on the two coupling units.

7. A tool fastening apparatus for industrial robots according to claim 2, in which:

each of the coupling units attached to the arm of the robot and the tool has a fluid passage coupling that provides a passage to supply a compressed air to operate the connected tool when the two coupling units are joined together.

8. A tool fastening apparatus for industrial robots according to claim 7, in which:

the fluid passage coupling on the coupling unit attached to the arm of the robot has a valve mechanism to open the fluid passage when said coupling unit is connected to the coupling unit attached to the tool.

9. A tool fastening apparatus for industrial robots according to claim 4, in which:

the guide pins and the pin holes to accommodate the guide pins are provided on the inside of the annularly arranged set of balls on the ball rings of the coupling units attached to the arm of the robot and the tool.

10. A tool fastening apparatus for industrial robots according to claim 8, in which:

the fluid passage couplings having the valve mechanism are provided on the inside of the annularly arranged set of balls on the ball rings of the coupling units attached to the arm of the robot and the tool.

11. A tool fastening apparatus for industrial robots according to claim 1, in which:

arched electric connectors carrying sets of terminals adapted to come in contact with each other are detachably attached with bolts to a portion of the periphery of contacting edges of the coupling units attached to the arm of the robot and the tool.

* * * * *